(12) United States Patent
Kosuda et al.

(10) Patent No.: US 7,256,981 B2
(45) Date of Patent: Aug. 14, 2007

(54) ELECTRIC DOUBLE LAYER CAPACITOR

(75) Inventors: Atsuko Kosuda, Tokyo (JP); Yoshihiko Ohashi, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/441,217

(22) Filed: May 26, 2006

(65) Prior Publication Data

US 2006/0274480 A1     Dec. 7, 2006

(30) Foreign Application Priority Data

May 27, 2005  (JP)  ............................ 2005-155876

(51) Int. Cl.
*H01G 9/00* (2006.01)
(52) U.S. Cl. ...................... 361/502; 361/504; 361/508; 361/512; 361/516; 361/519
(58) Field of Classification Search ................ 361/502, 361/503, 504, 508–512, 516–519, 523–528; 252/62.2
See application file for complete search history.

(56) References Cited

U.S. PATENT DOCUMENTS 5,754,393 A * 5/1998 Hiratsuka et al. ........... 361/505
6,574,092 B2 * 6/2003 Sato et al. ................... 361/502
6,879,482 B2 * 4/2005 Kawasato et al. .......... 361/502
7,061,749 B2 * 6/2006 Liu et al. ..................... 361/502
7,088,572 B2 * 8/2006 Yoshida et al. ............. 361/504
7,173,807 B2 * 2/2007 Kawasato et al. .......... 361/502

FOREIGN PATENT DOCUMENTS

JP      A 2003-243260    8/2003
JP      A 2004-087956    3/2004

* cited by examiner

*Primary Examiner*—Nguyen T. Ha
(74) *Attorney, Agent, or Firm*—Oliff & Berridge, PLC

(57) ABSTRACT

An electric double layer capacitor comprising a pair of electrodes and an electrolytic solution in contact with said pair of electrodes, wherein: the electrolytic solution contains a compound having the formula (1) and an organic solvent. Here, $R^1$ is a group selected from among dimethylene, trimethylene, tetramethylene and pentamethylene, and $R^2$ is tetramethylene or pentamethylene.

(1)

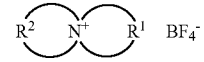

2 Claims, 2 Drawing Sheets

Fig.2

| | EXAMPLE 1 | | EXAMPLE 2 | | COMPARATIVE EXAMPLE 1 | |
|---|---|---|---|---|---|---|
| | INITIAL | AFTER 1000Hr | INITIAL | AFTER 1000Hr | INITIAL | AFTER 1000Hr |
| AC IMPEDANCE (OHMS AT 1 kHz) | 35.73 | 37.10 | 40.80 | 41.40 | 43.75 | 44.73 |
| CELL THICKNESS (mm) | 0.53 | 0.59 | 0.53 | 0.60 | 0.53 | 0.59 |
| CAPACITY (mF) | 44.90 | 35.04 | 42.80 | 35.52 | 42.28 | 33.80 |

ELECTRIC DOUBLE LAYER CAPACITOR

BACKGROUND OF THE INVENTION

1. Field of the Invention

This invention relates to an electric double layer capacitor.

2. Related Background Art

In recent years, much attention has been paid to electric double layer capacitors (EDLC). This type of electric double layer capacitor has a pair of electrodes, and an electrolytic solution in contact with the pair of electrodes.

As an electrolytic solution, a nonaqueous electrolytic solution, wherein an electrolyte is dissolved in the organic solvent, is used.

A typical electrolytic solution is a solution of tetraethylammonium tetrafluoroborate ($TEA^+BF_4^-$) as electrolyte, dissolved in propylene carbonate (PC) as organic solvent, or a solution of triethylmonomethylammonium tetrafluoroborate ($TEMA^+BF_4^-$) dissolved in propylene carbonate.

Electrolytic solutions containing quarternary ammonium cations are also known (e.g., JP No. 2003-243260 and JP No. 2004-87956).

SUMMARY OF THE INVENTION

In recent years, electric double layer capacitors are being required to have high capacity with low impedance. However, in earlier electric double layer capacitors, it was difficult to reconcile high capacity with low impedance.

This invention, which was conceived in view of the aforesaid problem, aims to provide an electric double layer capacitor which offers both high capacity and low impedance.

The Inventors, after studying the problem, found that the dual objectives of high capacity and low impedance could be achieved by using an electrolytic solution containing a specific electrolyte, and thereby arrived at the present invention.

The electric double layer capacitor relating to the invention comprises a pair of electrodes and an electrolytic solution in contact with this pair of electrodes. This electrolytic solution contains the compound (1) and an organic solvent.

Here, $R^1$ is a group selected from among dimethylene, trimethylene, tetramethylene and pentamethylene, and $R^2$ is a tetramethylene group or a pentamethylene group.

(1)

Here, preferably, $R^1$, $R^2$ are both tetramethylene groups, or $R^1$ is a tetramethylene group and $R^2$ is a pentamethylene group.

An electric double layer capacitor which admirably realizes both high capacity and low impedance can thereby be manufactured.

BRIEF DESCRIPTION OF THE DRAWINGS

FIG. 2 is a table showing, for Examples 1, 2 and Comparative Example 1, the initial impedance and after energizing for 1000 hours, the electrostatic capacity, and the thickness of the cell.

DESCRIPTION OF THE PREFERRED EMBODIMENTS

Figure 1:
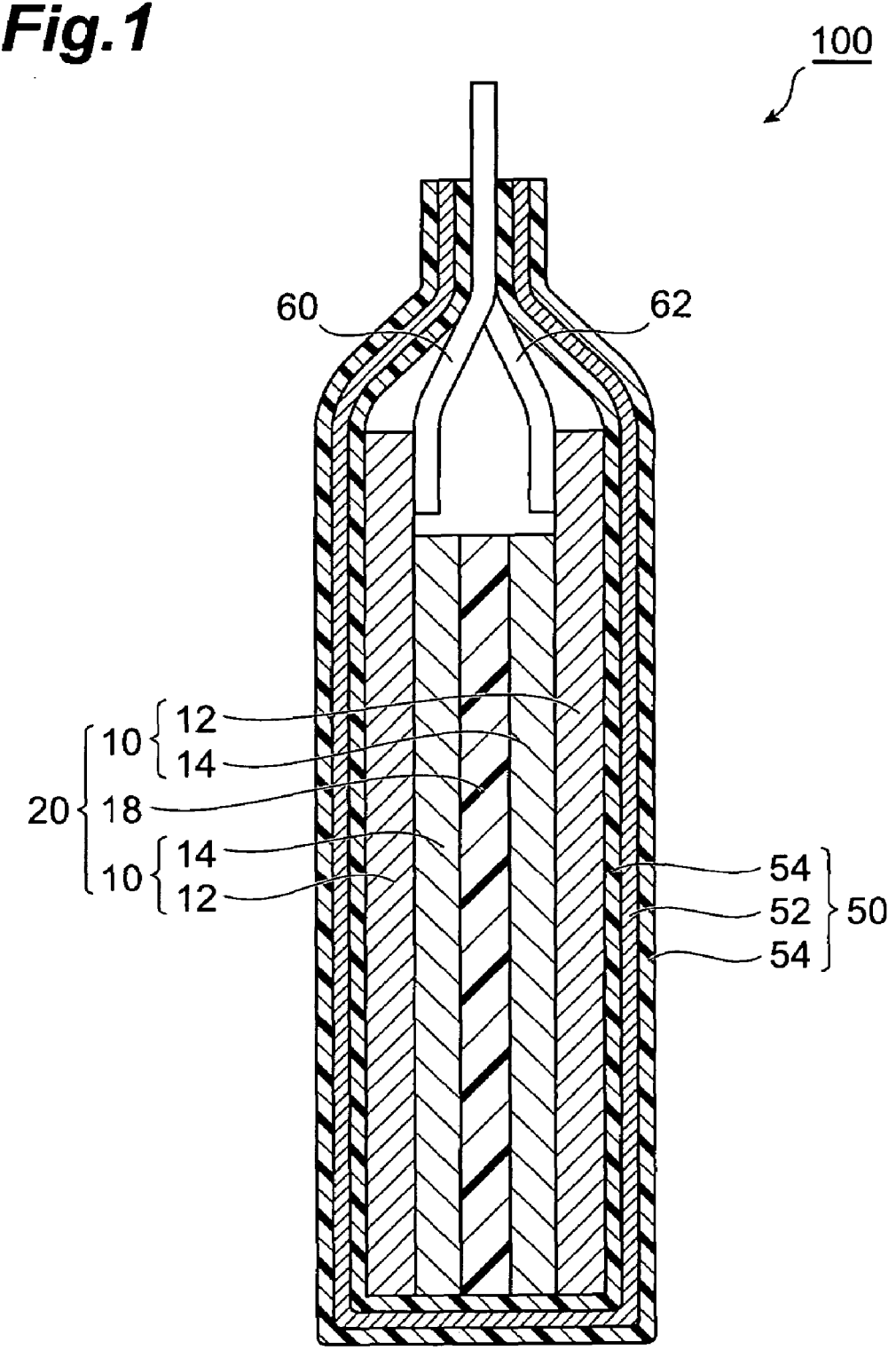
FIG. 1 is a cross-sectional view showing an electric double layer capacitor according to an example.

The electrolytic solution for the electric double layer capacitor relating to this example will now be described. The electrolytic solution for the electric double layer capacitor relating to this example contains an electrolyte and an organic solvent.

The electrolyte is a compound expressed by the formula (1). Here, $R^1$ is a group selected from among dimethylene ($CH_2CH_2$), trimethylene ($CH_2CH_2CH_2$), tetramethylene ($CH_2CH_2CH_2CH_2$) and pentamethylene ($CH_2CH_2CH_2CH_2CH_2$), and $R^2$ is a tetramethylene group or a pentamethylene group.

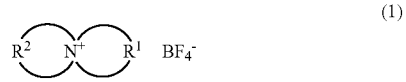

(1)

Here, preferably, $R^1$, $R^2$ are both tetramethylene groups, or $R^1$ is a tetramethylene group and $R^2$ is a pentamethylene group. In other words, the electrolyte is preferably a compound expressed by the following formulae (2) or (3).

(2)

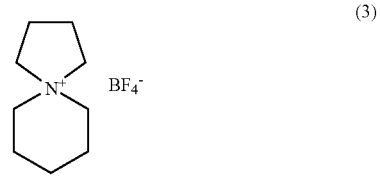

(3)

The organic solvent is not particularly limited, examples being ethylene carbonate (EC), propylene carbonate (PC), butylene carbonate (BC), sulfolane (SL) and γ-butyrolactone (GBL). These may be used independently, or may be mixed in any desired ratio.

The electrolyte concentration in the electrolytic solution is preferably within the limits of 1-3 mol/L.

This type of electrolytic solution has a high conductance, which evidently is why it is possible to manufacture an electric double layer capacitor of low impedance and high capacity. Moreover, the dielectric strength is higher than that of an ionic solution, and equivalent to that of TEA-BF or the like.

This electrolytic solution may take the form of a gel. For example, a gel electrolytic solution which is a mixture of compound (1), an organic solvent (plasticizer) and a polymer matrix does not flow, but is a film having its own properties.

An example of the electric double layer capacitor according to this example will next be described.

FIG. 1 is a cross-sectional view showing an electric double layer capacitor 100 relating to this example.

The electric double layer capacitor 100 mainly comprises a laminate 20, an external container 50 accommodating the laminate 20, and a pair of leads 60, 62 connected to the laminate 20.

The laminate 20 has a pair of electrodes 10 disposed facing each other on each side of a separator 18. The electrodes 10 respectively have an active material layer 14 formed on a charge collector 12. The active material layers 14, 14 are respectively in contact with both sides of the separator 18. The leads 60, 62 are respectively connected to the ends of the charge collectors 12, 12, the ends of the leads 60, 62 extending outside the external container 50.

The charge collector 12 is formed of a metal foil, such as for example aluminum foil.

The active material layer 14 comprises, for example, a mixture of an active material and a binder. The active material may be selected from among acetylene black, graphite, black lead or activated carbon, or these may be mixed and used in any desired ratio. The binder may be a fluororesin, such as for example polvinylidene fluoride (PVDF) or the like.

The separator 18 is a porous insulator. As an example of a porous insulator, a cellulose nonwoven fabric may be mentioned.

The laminate 20 is impregnated with the aforesaid electrolytic solution for an electric double layer capacitor. This electrolytic solution for an electric double layer capacitor mainly impregnates the separator 18 and the active material content layer 14 in the electrode 10. A gel type electrolytic solution may of course be used instead.

The external container 50 seals the laminate 20 and the electrolytic solution for an electric double layer capacitor inside. The external container 50 is not particularly limited provided that it can prevent leakage of the electrolytic solution for an electric double layer capacitor to the outside, and prevent entry of moisture into the electric double layer capacitor 100. The external container 50, as shown in FIG. 1, may be a metal laminate film comprising a metal foil 52 coated on both sides by a synthetic resin film 54. The metal foil may be for example an aluminum foil, and the synthetic resin film may be for example polypropylene or the like.

The leads 60, 62 are formed from a conductive material such as aluminum.

Since the electric double layer capacitor 100 uses the aforesaid electrolytic solution for an electric double layer capacitor, the dual objectives of high capacity and low impedance can be realized.

The electric double layer capacitor 100 can be manufactured as follows. First, the laminate 20, the external container 50 to which the leads 60, 62 are connected, and the electrolytic solution for an electric double layer capacitor, are respectively prepared. The laminate 20 and the external container 50 are thoroughly dried. Their moisture content can be sufficiently reduced by for example heating in air, and then heating in vacuum.

Next, the laminate 20 is placed inside the external container 50, the electrolytic solution for an electric double layer capacitor is dripped onto this laminate 20, and the external container 50 is sealed. This completes the manufacture of the electric double layer capacitor.

The electric double layer capacitor 100 is not limited to the aforesaid form, and for example may comprise plural laminates 20.

EXAMPLES

Example 1

The electric double layer capacitor of Example 1 was fabricated as follows.

Manufacture of Electrode

A coating material was prepared by mixing acetylene black as active material and PVDF as binder in the ratio active material:binder=80:20, adding N-methylpyrrolidone to the mixture, and kneading.

This coating material was coated on one side of a 30 μm etching aluminum foil by the doctor blade method, and dried. Next, the aluminum foil was punched out in rectangular shapes having coated area and uncoated tab, and a pair of electrodes for an electric double layer capacitor was thus obtained.

Manufacture of Cell

The two punched electrodes were disposed facing each other via a recycled cellulose nonwoven fabric as separator, and bonded by thermocompression to obtain a laminate. Aluminum leads were welded to the tabs of this laminate by ultrasonic welding. The laminate with attached leads was placed in a bag-like aluminum laminate film open on two of its four sides, the leads were taken out from one opening, and bonded by thermocompression on both sides of the leads. The electrolytic solution for an electric double layer capacitor was poured into the laminate from the last remaining opening in the aluminum laminate external container containing the laminate, and the remaining opening was sealed by vacuum thermocompression bonding to obtain the electric double layer capacitor of Example 1 as shown in FIG. 1. The electrolytic solution for an electric double layer capacitor was a mixture of PC as organic solvent and the compound of formula (2) as electrolyte, and the electrolyte concentration was 1.5 mol/L.

Example 2

In Example 2, an electric double layer capacitor was obtained as in Example 1, except that the electrolyte was the compound of formula (3).

Comparative Example 1

In Comparative Example 1, the procedure was identical to that of Example 1 except that the electrolyte was tetraethylammonium tetrafluoroborate, and the electrolyte concentration was 1.0 mol/L.

Properties of Electric Double Layer Capacitor

For the electric double layer capacitors of the examples and comparative examples, the initial impedance (value at 1 kHz), initial electrostatic capacity, initial cell thickness, impedance after energizing at 2.7 V at 70° C. for 1000 hours, electrostatic capacity and the thickness of the cell were measured. These values are shown in FIG. 2.

For Examples 1 and 2, compared with Comparative Example 1, the impedance was small, electrostatic capacity was adequate and the thickness of the cell was also satisfactory.

What is claimed is:

1. An electric double layer capacitor comprising a pair of electrodes and an electrolytic solution in contact with said pair of electrodes, wherein:

said electrolytic solution contains a compound having the formula (1) and an organic solvent. Here, $R^1$ is a group selected from among dimethylene, trimethylene, tetramethylene and pentamethylene, and $R^2$ is tetramethylene or pentamethylene

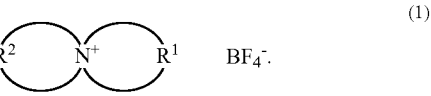

(1)

2. The electric double layer capacitor according to claim 1, wherein $R^1$, $R^2$ are both tetramethylene groups, or $R^1$ is a tetramethylene group and $R^2$ is a pentamethylene group.

* * * * *